United States Patent [19]

Ostergaard et al.

[11] Patent Number: 4,910,684
[45] Date of Patent: Mar. 20, 1990

[54] METHOD OF CONTROLLING A ROTARY KILN DURING START-UP

[75] Inventors: Jens J. Ostergaard; Klaus Gadeberg, both of Valby, Denmark

[73] Assignee: F. L. Smidth & Co. A/B, Denmark

[21] Appl. No.: 229,154

[22] Filed: Aug. 5, 1988

[30] Foreign Application Priority Data

Aug. 6, 1987 [DK] Denmark ............................ 4110/87

[51] Int. Cl.⁴ .......................... F26D 7/00; G06F 15/46
[52] U.S. Cl. ..................................... 364/503; 364/148; 364/200; 364/274.6; 432/4; 432/24
[58] Field of Search ............... 364/148, 503, 807, 200, 364/274.6; 432/4, 5, 24, 43

[56] References Cited

U.S. PATENT DOCUMENTS

| | | | |
|---|---|---|---|
| 3,759,659 | 9/1973 | Bay | 432/24 |
| 4,432,061 | 2/1984 | Herklotz et al. | 364/148 |
| 4,461,616 | 7/1984 | Vukovich, Jr. | 432/24 |
| 4,480,992 | 11/1984 | Okamoto | 432/24 |

OTHER PUBLICATIONS

Wolfinger, J. P., "Improving Control of Cement Kilns", *Control Engineering*, vol. 20, No. 11, pp. 54–56, 1973.

Zadeh, L. A., "Outline of a New Approach to the Analysis of Complex Systems and Decision Processes", IEEE Trans. on Systems, Man & Cybernetics, vol. SMC-3, No. 1, Jan. 1973.

Mamdani, E. H., "Application of Fuzzy Algorithms for the Control of Dynamic Plant", Proc. IEE, vol. 121, No. 12, 1974.

Haspel, D. W., "Application of Rule-Based Control in the Cement Industry", Unicom Seminars, London, Dec. 1985.

King, R. E., "Expert Systems in the Cement Industry", ZKG No. 4, 1987.

Sheridan S. & Skjoth, P., "Automatic Kiln Control at Oregon Portland Cement Company's Durkee Plant, Utilizing Fuzzy Logic", IEEE Texas, May 1983.

"Control of a Cement Kiln by Fuzzy Logic", by L. P. Holmblad and J. J. Ostergarrd, published by North-Holland Publishing Company, 1982.

*Primary Examiner*—Gary Chin
*Assistant Examiner*—Brian M. Mattson
*Attorney, Agent, or Firm*—Baumbaugh, Graves, Donohue & Raymond

[57] ABSTRACT

To facilitate a smooth and quick start-up of a rotary kiln, a Fuzzy Logic Control system is proposed, the principal feature of which is to mandate control actions to decrease the specific heat consumption along a straight line from an initial high value to a steady-state value established for the kiln, and then to switch over to an existing steady-state fuzzy logic control mode. In the start-up phase, further process variables are preferably measured and monitored against reference values to mandate concurrent control actions influencing the Fuzzy Logic Control system in a weighted manner.

1 Claim, 8 Drawing Sheets

```
 0 NAME: W1X2CTL\1\
 1 *
 2 * THIS PROGRAM CONTROLS THE
     OXYGEN BY ADJUSTING THE
 3 * COAL FEED RATE.
 4 *
 5 INPUT O2\W1W01X1,0.7,1.6,3\
 6 OUTPUT DCOAL\W1V19SP,0.5\
 7 *
 8 IF LOW(O2)   THEN MNEG(DCOAL)
 9 IF OK(O2)    THEN ZERO(DCOAL)
10 IF HIGH(O2)  THEN MPOS(DCOAL)
11 *
12 END
```

METHOD OF CONTROLLING A ROTARY KILN DURING START-UP

FIELD OF THE INVENTION

This invention relates to a method of controlling a rotary kiln during start-up after a period of stoppage, and more particularly the invention has to do with the development of automatic procedures for facilitating a smooth and quick start-up.

BACKGROUND OF THE INVENTION

Automatic computer control of kiln systems has been a challenge for control engineers in the cement industry ever since the appearance of process computer systems in the mid-sixties. The first attempts were based on the application of multivariable control theory together with mathematical models of the kiln systems. The results were rather disappointing and the systems never matured to a state, where they became commercially available.

Starting in the mid-seventies a different approach to computer control of cement kilns was pioneered and became known as the FLS-SDR/Fuzzy computer control system. This is described in a publication FLS-review 67, which is a reprint of an article entitled "Control of a cement kiln by fuzzy logic" by L. P. Holmblad and J.-J. Ostergaard, published by North-Holland Publishing Company, 1982. Briefly, based on the concept of Fuzzy Logic the control strategy was formulated as a set of linquistic control rules transferring the experience of human kiln operators to an automatic computer control program. The FLS-SDR/Fuzzy computer control system has been marketed since 1980 and has today been installed on a considerable number of kilns. These systems have clearly demonstrated that the Expert System approach embedded in the Fuzzy control concept is capable of efficiently controlling different kiln systems, and on-line control figures of 85-90% are usually achievable.

However, up until now automatic control has been applied in more or less stead-state operation only after manual start-up of the kiln. The controller usually takes over when production has reached 70-100% of normal load, depending on the duration of the kiln stop; the shorter the stop, the earlier the controller can usually be switched on.

SUMMARY OF THE INVENTION

It is the object of the present invention to extend the use of automatic procedures to the start-up phase, and this is achieved by the features recited in claim 1. When using the method there defined, it has been found possible to switch on the automatic control means immediately after kiln raw material feed has been turned on at 30-35% of nominal kiln load. From there, the controller will automatically bring up the kiln to normal production level by gradually increasing in a co-ordinated way kiln feed, kiln speed, fuel, air to the kiln system and cooler grate speed if a cooler grate is included. When normal production level has been reached, the control is automatically switched to steady-state control mode. Like the control scheme for steady-state kiln operation, the start-up control strategy is formulated as a set of control rules using Fuzzy Logic as an inference method, but the rule set as well as control parameters are especially designed for the start-up purpose.

FUZZY CONTROL CONCEPT

Before proceeding to a detailed description of the start-up control strategy, a brief outline will be given of the basic principles of the SDR/Fuzzy control concept.

In many industrial processes, the problems of limited number of measurable variables, of unreliable measurements, of time delays and of non-linearities have resulted in a low level of automation. This characterization certainly applies to the cement industry. Cement manufacturing is a process that is complex and difficult to automate and the control functions—especially on the supervisory and coordinative level—is to a great extent left to the skill and experience of human operators.

Fuzzy Control, the application of Fuzzy Logic techniques to automatic control, offers an interesting and attractive alternative in these cases. For a better understanding of the concept of Fuzzy Logic Control and its application, reference is made to the literature listed at the end of this description, which includes the FLS-review 67 method above.

The principles of fuzzy logic control, as applied to steady stage operation of a rotary kiln, will in the following be described by quotation of parts of said FLS-review with reference to FIGS. 1-5 corresponding to FIGS. 2, 3, 6, 7 and 8 therein, viz.

BRIEF DESCRIPTION OF FIGURES ILLUSTRATING THE PRIOR ART AND THE INVENTION

In the quotation to follow, the references to figures have been changed in accordance with the above mentioned re-numbering.

2. FUZZY CONTROL PRINCIPLES.

2.1 Linguistic Control Rules.

The application of fuzzy logic techniques to control is tied together with the concept of linguistic control rules. A fuzzy controller consists of a set of control rules, each rule being a linguistic statement about control actions to be taken for a given process condition:

if (condition) then (control actions).

Statements on conditions could go like "the liter weight is high", or "the back end temperature is somewhat low". Likewise, statements on control action might for example read "make a medium reduction in coal feed rate", or "open slightly the exhaust gas fan damper".

The key items in the control rules are terms like "medium reduction", "open slightly", "high" and "somewhat low". In linguistic approximation by fuzzy logic each of these terms is represented by a unique fuzzy membership function that for a given process condition is used to establish a value in the interval (0,1). Hence, the logic value of a condition, which is ordinary binary logic is restricted to "true" and "false" (0 or 1), in fuzzy logic can take any value in the interval (0,1), the logic value being a measure of the fulfillment of the condition for a given process state.

To illustrate how fuzzy logic is applied to expressions as "if oxygen percentage is high ... " and "if oxygen percentage is OK ... ", FIGS. 1 and 2 illustrate graphically the difference between classic 1/0 logic (true/false logic) and fuzzy logic.

Figure 1:
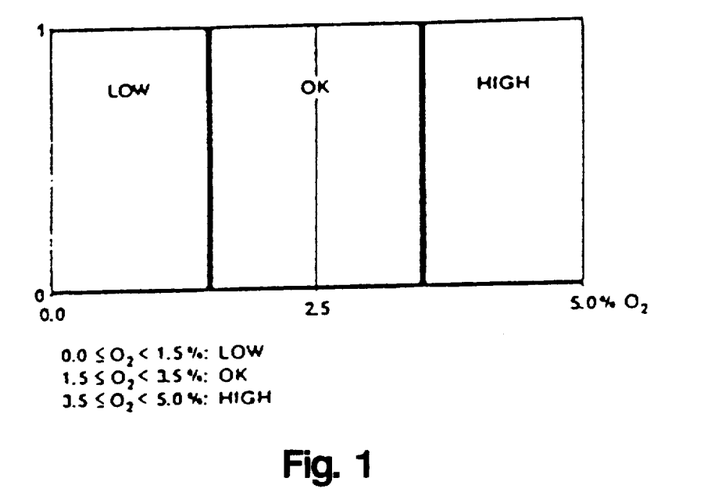
FIG. 1 is a graphic representation of the terms "Low", "OK" and "High" in classic 0/1 logic (false/true logic).
Figure 2:
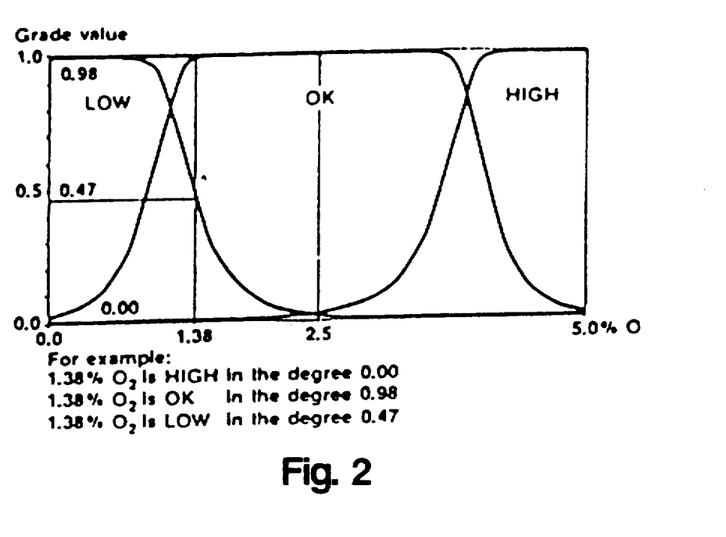
FIG. 2 is a graphic representation of the terms in FIG. 1 in fuzzy logic.

In classic logic, FIG. 1, a given process value in the interval concerned, in this case 0-5% $O_2$, would be either LOW, OK, or HIGH. In fuzzy logic, FIG. 2, the terms LOW, OK, HIGH, etc. are represented as "soft" curves, as opposed to the block curves of classic logic, and they show a given process value in principle as LOW and OK and HIGH in various degrees between 0 and 1. The idea behind the "soft" definition curves is to represent as realistically as possible the gradual transition between the human conception of values being e.g. "LOW" and not "LOW", and to avoid the sudden jumps at definite values.

2.2 A Fuzzy Controller.

The following example serves to illustrate how a simple controller is formulated and handled in fuzzy logic. In the example, the surplus oxygen in a burning process, e.g. a cement kiln, is assumed to be controlled via fuel rate regulation. The air flow is constant, and when the oxygen percentage is too high or too low, the fuel rate is adjusted accordingly. It must be emphasized, however, that the problems involved are not quite that simple in the actual operation of a cement kiln and are only used here to explain the fuzzy control principle.

Figure 3:
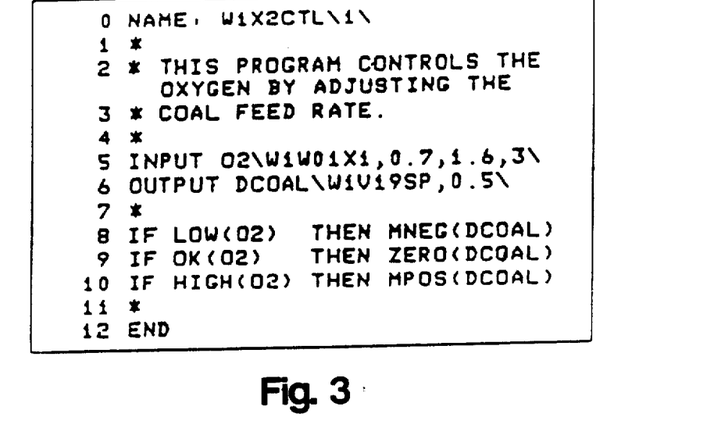
FIG. 3 illustrates a computer program embodying a fuzzy logic rule set.

FIG. 3 shows a computer program for fuzzy logic control formulated in the language developed at F. L. Smidth for computerized process control. There are three control rules in question, lines 8-10, which indicate how the coal feed rate is to be adjusted (DCOAL) in relation to oxygen percentage (02). The INPUT line defines from where the measurement of the actual oxygen percentage is available (point label W1W01X1 in the measurement data base), and specifies the constants for scaling the oxygen percentage. The example shows 1.6% $O_2$ as normal value, while 0.7% and 3.0% are the scale limits of the low and high oxygen percentages, respectively. Note that the scaling interval is not necessarily symmetrical with respect to the normal value. The OUTPUT line defines correspondingly where the calculated change in fuel rate is intended (data base point label W1V19SP), also indicating the scale factor for control actions, i.e. the physical value regarded as the upper limit of an individual action, in this case a change of 0.5 t/h. Section 3 will deal with the programming language in more detail.

Figure 4:
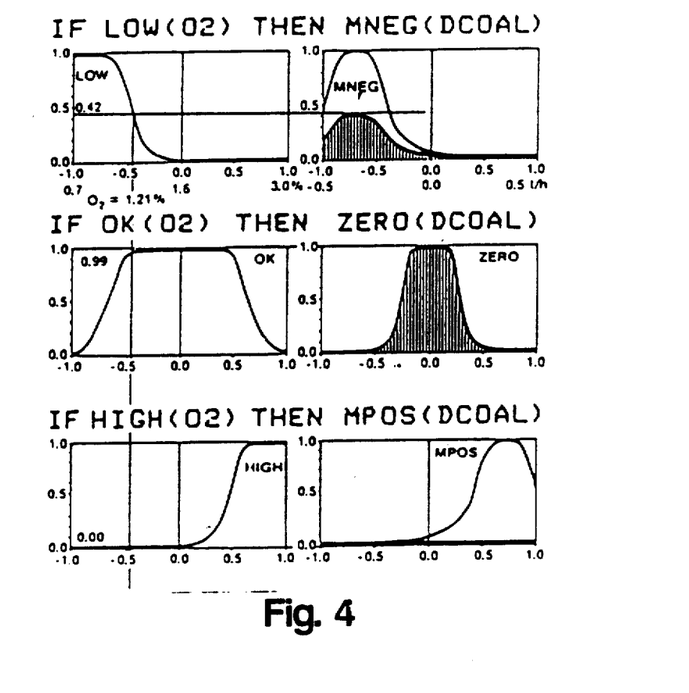
FIG. 4 is a graphic illustration of the manner of determining control actions from the fuzzy logic rule set of FIG. 3.

FIG. 4 illustrates graphically the control rules and the calculation sequence at a measured oxygen percentage of 1.21%. The first rule IF LOW (02) THEN MNEG (DCOAL) indicates that a medium negative change in coal feed rate is required. The oxygen percentage 1.21% is in the chosen interval only LOW In the degree 0.42 which is why the MNEG action is not to be effected fully but dampened accordingly. The shaded MNEG area is thus regarded as the contribution of the first rule to the resulting control action which is arrived at by combining this contribution with those of the subsequent rules. In the next rule, IF OK(02) THEN ZERO (DCOAL), 1.21% oxygen is OK In the degree 0.99, so the ZERO action is taken with almost full weight. The MPOS action of the last rule has no effect as 1.21% oxygen is HIGH in the degree 0.0 1.21% oxygen is thus OK with a tendency toward LOW, and the fuzzy control action will be ZERO to MNEG.

Figure 5:
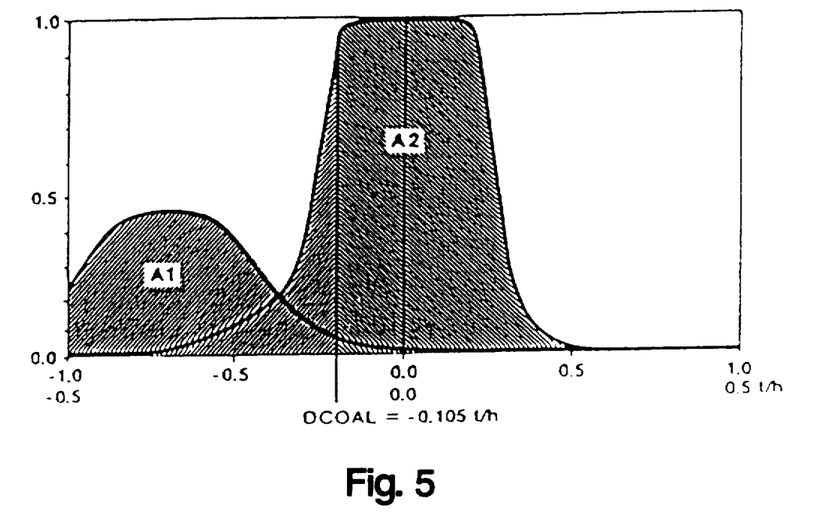
FIG. 5 illustrates the determination of a resultant control action by combining the individual control actions determined by the fuzzy logic rule set represented in FIGS. 3 and 4.

FIG. 5 shows how the physical control action is determined. The area contributions from individual rules are collected, and the control action is determined as the abscissa value dividing the combined area into two equal parts (A1=A2). In the case in question, DCOAL = −0.105 t/h. 1.21% oxygen hence results in a reduction of the coal feed by 0.105 t/h.

It will be seen that in principle all three rules influence the resultant control action according to the degree of fulfillment. Even though the control strategy only consists of three apparently rough and inaccurate control instructions, the fuzzy logic technique implies assessment of the degrees to which the conditions in question are met and then weighs up the pros and cons so that the resultant action becomes a "reasonable" compromise between the sayings of the individual rules.

It has for a long time been recognized that control of the kiln start-up had to be addressed differently from control of the kiln in normal operation. Also, it has been argued that automatic kiln start-up perhaps was not so interesting as control of steady-state operation, considering that start-up periods hopefully would be very short compared to the periods of normal operation.

However, it remains a fact that kiln start-up constitutes a period of considerable risk for damage to the kiln, requiring a lot of operator attention, and that a smooth and quick start-up may save substantially in terms of equipment failure and production loss.

DESCRIPTION OF A PREFERRED EMBODIMENT

FIG. 1 illustrates a rotary kiln of conventional type for producing cement clinker by heating a mixture of limestone, clay and sand components. The kiln is a long steel tube 101, which is mounted at a slight inclination from horizontal and is rotated by a kiln drive 102 at a speed of 1-2 rev/min. The clinker production is a continuous process. A slurry of the raw materials is fed at 103 through a system of cyclones 104 to the upper end 105—or back end—of the kiln, while fuel, e.g. coal dust, is fed at 106 to a burner at the lower—or firing—end 107 of the kiln. Due to the inclination and rotation of the kiln tube 101, the material is transported slowly through the kiln in 3-4 hours and heated in countercurrent with the hot combustion gases from the burner, the combustion gases being drawn through the kiln and the cyclones 104 by an exhaust gas fan 108 that may be provided with a control damper (not shown). In the cyclones 104, the exhaust gases flow in countercurrent to the raw materials, and the cyclones therefore serve as preheaters for the raw materials.

Figure 6:
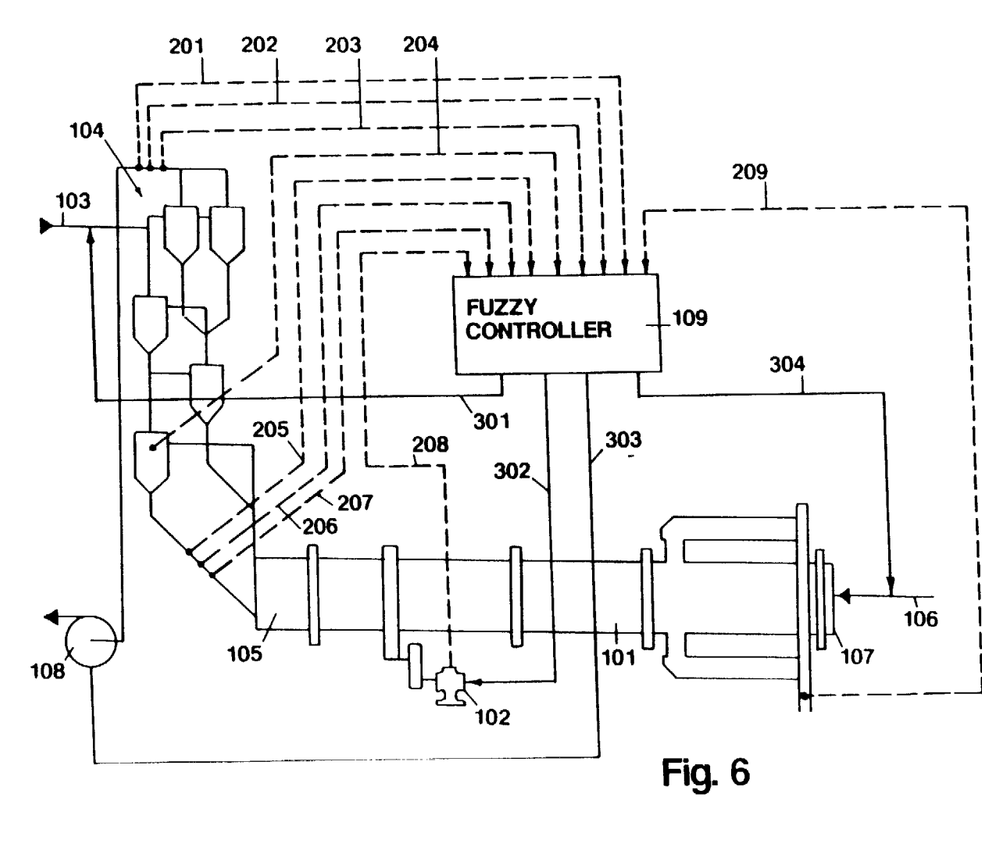
FIG. 6 is a diagrammatic illustration of a rotary cement kiln and a computer, referred to as Fuzzy Controller, incorporating facilities for use in carrying out the start-up method of the invention according to one embodiment thereof.

For controlling the kiln, a so-called fuzzy controller 109 is provided, in which fuzzy logic rule sets and the required programs for fuzzy logic evaluation, as represented in FIG. 2, for fuzzy logic determination of control action signals, as represented in FIG. 4, and for fuzzy logic weighted averaging of control action signals, as represented in FIG. 6, are stored. Preferably, the fuzzy logic controller incorporates modes for both the automatic start-up phase and for steady state operation, and forms part of a process computer system incorporating also data acquisition, reporting and supervision functions.

Input connections to the fuzzy controller 109 from measuring locations for process variables are shown as follows:
201: Temperature after the preheater system.
202: 02 after the preheater system.
203: CO after the preheater system.
204: Temperature in the lowermost cyclone.
205: 02 at the kiln inlet (back-end).
206: CO at the kiln inlet (back-end).
207: NO at the kiln inlet (back-end).
208: Kiln drive torque.
209: Clinker quality (liter weight and/or free lime, usually manual measurement).

Output connections from the fuzzy controller 109 to kiln controls are shown as follows:
301: Kiln feed.
302: Kiln speed.
303: Exhaust gas fan speed.
304: Fuel to kiln.

In the following is outlined the basic ideas behind a kiln start-up strategy that was tested out on a 3000 tpdy 4 stage preheater kiln 1 of the type described that had previously been equipped with a fuzzy controller 109 capable of controlling the kiln during normal operation.

The objectives of the kiln start-up strategy was to be able to control the kiln automatically from the time that feed was applied to the kiln at 103. Initially, the operator will have preheated the kiln to reach the proper temperature conditions of the system. For very short kiln stops, this period is virtually nil, but after longer kiln stops, e.g. with re-bricking or extensive repair jobs, the pre-heating period may be quite long up to 30 hours.

During the automatic start-up procedure, the computer gradually increases fuel, speed, raw material feed and air to the kiln at 106, 102, 103 and 108, respectively, in order to reach the normal operating levels, at which stage the controller automatically switches on the steady-stable control mode. The basic principle for the timing of increasing these values is to let the specific heat consumption (kcal/kg clinker) follow a straight line from a high initial value to a finishing value equal to a value at which the kiln normally operates. The initial value is determined in relation to the duration of the preceeding kiln stop. The actual determination of the stop duration will be further described below. In the present case, the initial value was set at 1100 kcal/kg for a "stop" of 0 minutes, up to a value of 1500 kcal/kg for a "stop" of 3 hours or more as illustrated by the graph in FIG. 7. The finishing value is continuously "remembered" by the system from normal operation.

The length of the start-up period is then determined from the allowed fuel change/min, a control parameter set as part of the tuning of the control strategy for the kiln. This value together with the initial kcal/kg clinker determines the slope of the ramp that constitutes the driving force in the start-up period, as will be further explained later with reference to FIGS. 8a and 8b.

However, a number of other measurements are also monitored during start-up to ensure stable kiln operation. These were primarily the kiln drive torque, at 208, $O_2$, NO and CO after the preheater, at 205, and the temperatures at selected points in the preheater, foremost in the 4th stage cyclone of the latter at 204 and after the preheater at 201. The measurements are monitored against ramping reference values determined by measured initial values and previously "learned" final values. During start-up, deviations between actual measured values and the reference values will influence the control actions. Control actions are exercised on fuel to the kiln at 106, on exhaust gas fan dampers at 108, and on kiln speed at 102. During the entire start-up, kiln feed and kiln speed remains synchronized to maintain constant degree of material filling in the kiln.

The stop-time of the kiln used to determine the starting value of the kcal/kg set-point ramp is determined as the time interval selected temperatures in the preheater have been below certain values. The kiln in question was considered "stopped" when the temperature in the 4th cyclone dropped below 815° C., and "started" only when the temperature again got over this value. By this, it is seen that the stop-time is not merely the outage time of the kiln motors, but more a measure of the time the kiln has lacked sufficient heat input.

The entire start-up control strategy is written in the FCL language part of the SDR/Fuzzy system, resulting in about 50% extra program lines than used in case of only normal operation control.

Figure 8A:
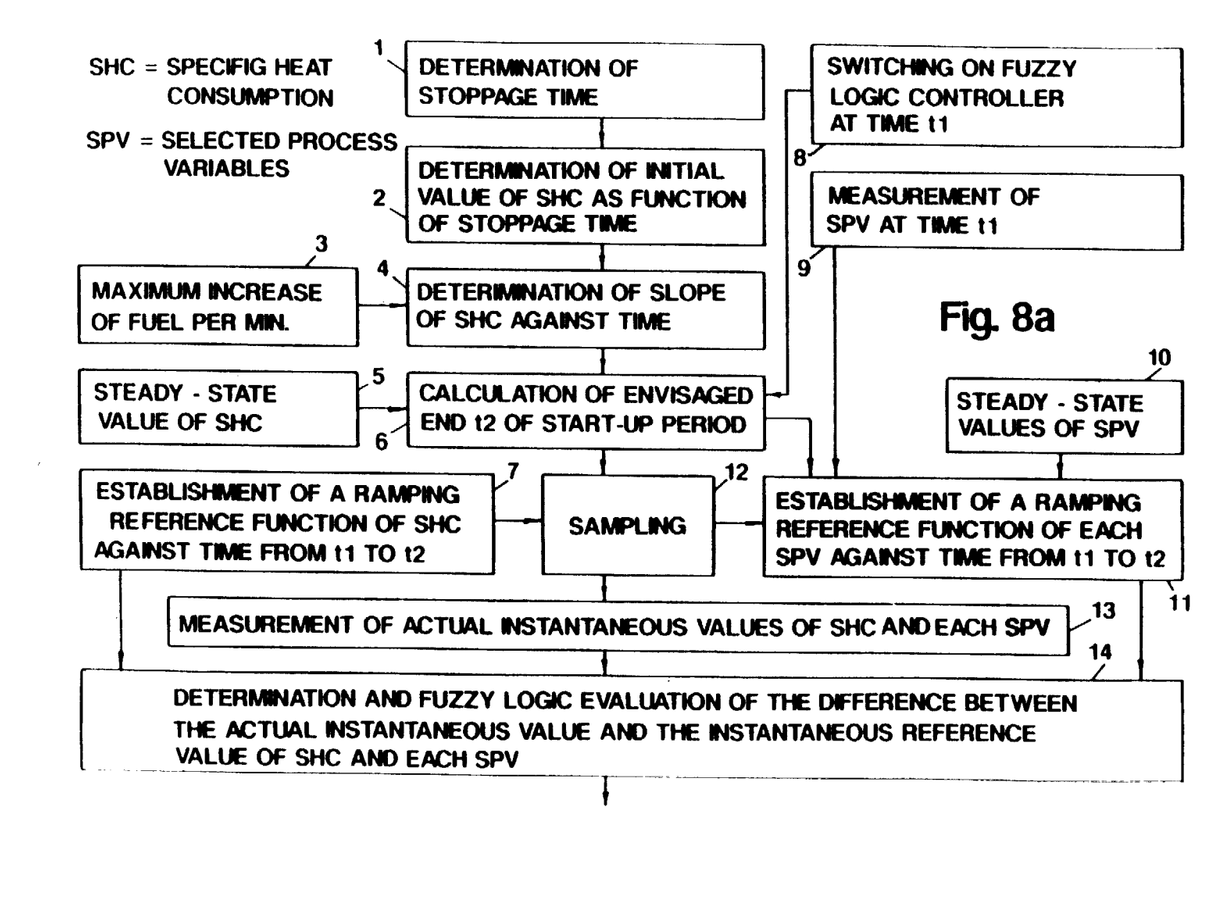
FIGS. 8a and 8b, when combined, are a diagrammatic illustration of the electric and electronic steps serving to carry out the kiln start-up method of the invention according to one embodiment thereof.
Figure 8B:
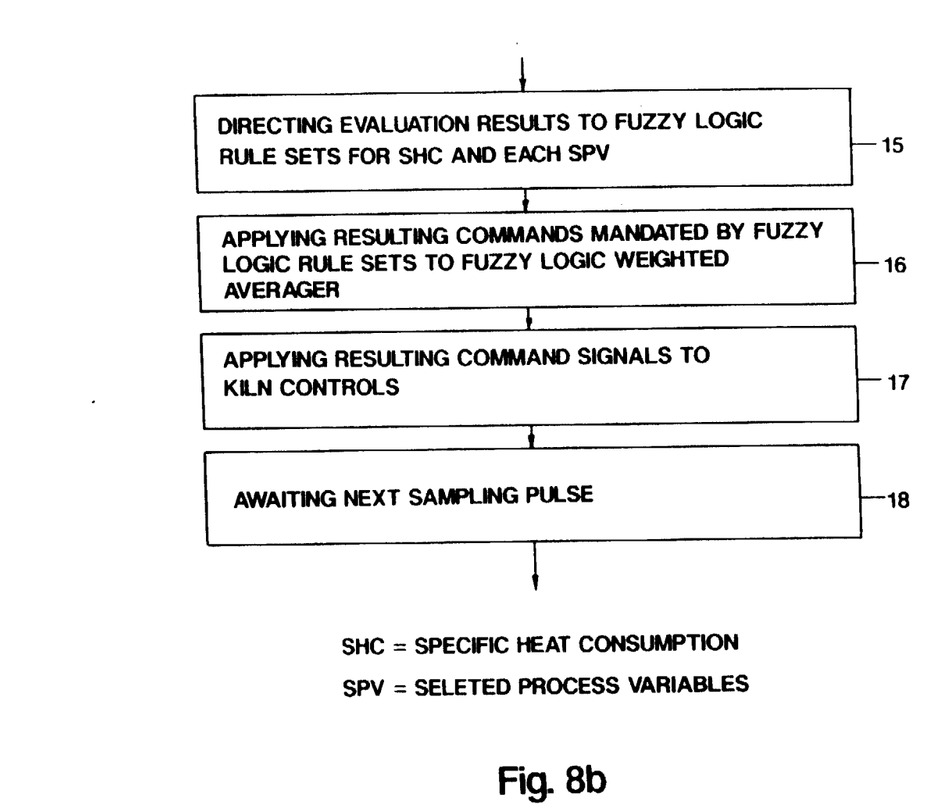

Referring now to the FIGS. 8a and 8b, these are a diagrammatic illustration of the steps described above and are believed to be substantially self-explanatory. For identification purposes, the boxes illustrating the various steps are numbered, but the numbers do not necessarily indicate the succession of the steps. In fact, e.g. the values mentioned in boxes 3, 5 and 10 may be more or less permanently stored, and the stoppage time mentioned in box 1 will be available from the general survey system of the kiln.

Figure 7:
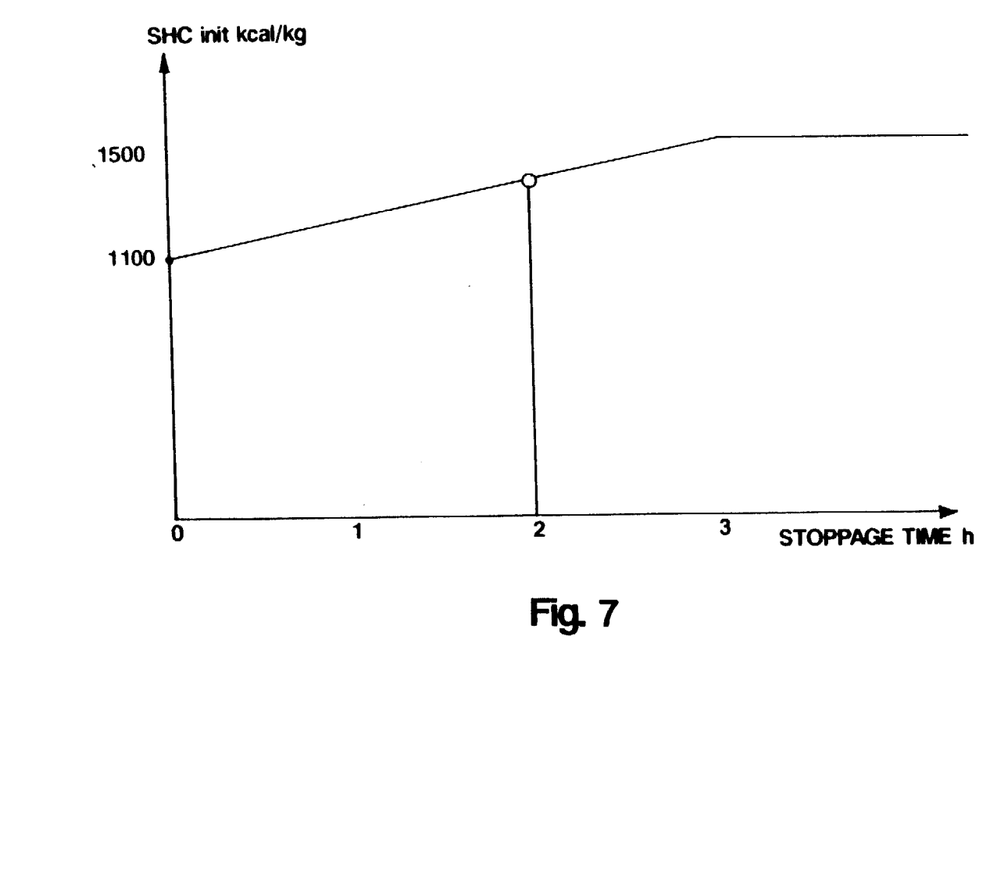
FIG. 7 shows an example of a graph for determining an initial value of the specific heat consumption to be used in the automatic start-up phase of a given kiln.

After the stoppage time has been determined in box 1, the initial value of the specific heat consumption, SHCinit, is determined in box 2 by means of the graph in FIG. 7. Thus, for a stoppage time of 2 hours, SHCinit will be set at the value marked in FIG. 7. The function illustrated by the graph will have to be established once and for all (subject of course to adjustment) for a particular kiln from experience, testing and verification.

In box 4, the slope of SHC against time is now determined from the maximum increase of fuel per minute, illustrated as being stored in box 3.

It is thereafter possible in box 6 to calculate the envisaged end time t2 of the start-up period, viz. the time when the loping SHC graph, starting from the value SHCinit at the time t1 of switching on the fuzzy logic controller (from box 8), will assume the steady-state value SHCsteady, illustrated as being stored in box 5. It will be realized that SHCsteady is of course known from normal operation of the kiln.

In box 7, a ramping reference function of SHC against time from t1 to t2 is established. This function is illustrated by the graph in FIG. 9, which is of course in fact the same as that which was used for the determination in box 6.

Quite similarly, ramping reference functions for other selected process variables SPV are established in box 11 from measured values at the time t1 (box 9) and stored steady-state values (box 10) at the time t2.

The actual instantaneous values of SHC and SPV are measured in box 13, and both these and the ramping reference functions in boxes 7 and 11 are sampled by recurring pulses from box 12.

In box 14, the difference between the actual instantaneous value and the instantaneous reference value of SHC and each SPV is determined. This step, like all previous steps, is executed by conventional mathematical calculation, such as will now be explained with reference to FIG. 9.

Figure 9:
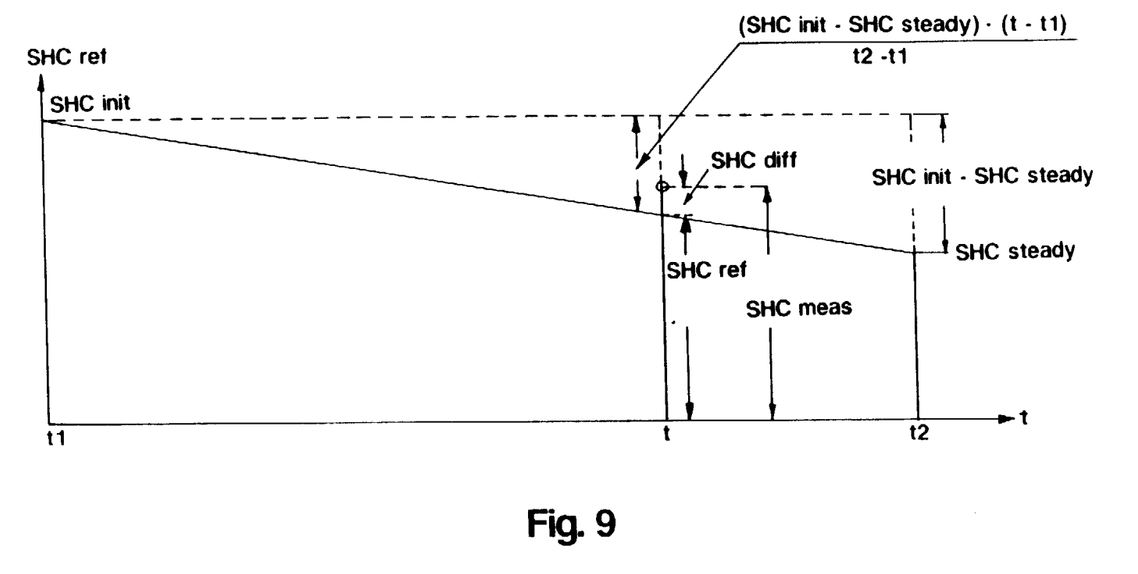
FIG. 9 illustrates a ramping reference function of the specific heat consumption against time during the automatic start-up period.

FIG. 9 shows that at the starting time t1 of the automatic start-up phase, the reference value of SHC is SHCinit, and that at the end of that phase, the reference value of SHC is SHCsteady. Let us consider the situation where one of the recurrent sampling pulses is supplied from box 12 at the time t. A simple proportionality calculation will show that at the time t, the reference value of SHC is $$SHCref = SHCinit - \frac{(SHCinit - SHCsteady)(t - t1)}{t2 - t1}$$

If at the same time t, the value of SHC measured in box 13 is SHCmeas, the determination of the difference in box 14 is:

SHCdiff = SHCmeas = SHCref, as also illustrated in FIG. 9.

The further step in box 14 is the fuzzy logic evaluation of SHCdiff. This is the step illustrated in prior art FIG. 2, with the difference, however, that here it is applied to a mathematically calculated difference value, and not to a directly measured value. It must be determined, once and for all, from expert knowledge and experience, which values of SHCdiff are to be considered HIGH, SMALL POSITIVE (SPOS), SMALL NEGATIVE (SNEG), LOW, etc. The operation illustrated in FIG. 2 will then determine to which degree (between 0 and 1) a given value of SHCdiff fulfills the various terms.

In box 15, the evaluation results from box 14 are to be applied to fuzzy logic rule sets. These, again, have to be established from expert knowledge and read into the computer for permanent storage therein. A rule set relating to coal adjustment during start-up from SHCreference ramp might read:

IF HIGH (SHCdiff) THEN SNEG (DCOAL)
IF SPOS (SHCdiff) THEN ZERO (DCOAL)
IF ZERO (SHCdiff) THEN ZPOS (DCOAL)
IF SNEG (SHCdiff) THEN SPOS (DCOAL)
IF LOW (SHCdiff) THEN MPOS (DCOAL)

where DCOAL means change of coal feed per minute, ZPOS=zero positive=slightly positive, MPOS=medium positive, and the other expressions have been explained earlier (or are self-evident).

There will be a considerable number of fuzzy logic rule sets some of which may involve one or two SPVdiff's, or SHCdiff and one SPVdiff and may mandate commands to one or two kiln controls.

In box 16, the resulting commands mandated by the rule sets in box 15 are to be applied to a fuzzy logic weighted averager. This is the operation illustrated in prior art FIG. 4. The operation is obviously performed separately for mandated commands to separate kiln controls.

In box 17, the resulting command signals are applied to the respective kiln controls, and then in box 18, the next sampling pulse is awaited.

Generally speaking, the electric and electronic equipment, circuits and storage facilities used for carrying out steps 1–20 must not necessarily be specially provided for the starting-up phase, but may in part be implemented in that used for steady state fuzzy control or general survey.

While the invention has been described above with reference to a particular type of a conventional rotary kiln system for use in the cement industry, it is to be understood that the invention is equally applicable to other types of rotary kiln systems for use in the cement industry and analogous industries where a rotary kiln forms the main processing component.

Moreover, it is observed that the concept of Fuzzy Logic Control is to be construed in its broadest sense so as to include any form of control system, irrespective of its practical modality, which is capable, on the basis of pre-set data and relationships established empirically or by experience, and of measured values of a plurality of process variables, to mandate concurrent control actions and to weigh these against one another such as to arrive at a concerted control similar to that which would be exercised by an experienced operator.

What is claimed is:

1. A method of controlling a rotary kiln during start-up after a period of stoppage, including the steps of
   (1) starting the kiln,
   (2) initiating a computer-based fuzzy logic controller and marking the time of initiating the controller and by means of such controller:
   (3) determining stoppage time as a time interval during which temperatures in selected areas of the rotary kiln have been below preset values,
   (4) determining an initial value of specific heat consumption of the kiln, said specific heat consumption being defined as a quantity of heat energy consumed per weight unit of clinker product from an empirically established function of the stoppage time,
   (5) determining a slope value of the specific heat consumption against time from a maximum permissible increase of fuel per minute,
   (6) determining envisaged end time of a start-up period from said initial value of the specific heat consumption, said slope value and the time of initiating the fuzzy logic controller,
   (7) establishing a ramping reference function of the specific heat consumption against time from said initial value at the time of initiating the fuzzy logic controller to a steady-state value at the end time of the start-up period,
   (8) establishing ramping reference functions of other selected process variables from measured values at the time of initiating the fuzzy logic controller to steady-state values at the end time of the start-up period,
   (9) measuring actual instantaneous values of the specific heat consumption and said other selected process variables during the start-up period,
   (10) sampling both the values measured in step (9) and the ramping reference functions established in step (8), (11) at each sampling, determining a difference between an actual instantaneous value of the specific heat consumption and each of said other process variables measured in step (9) and the instantaneous reference value of the specific heat consumption and said other process variables derived from step (7) and step (8), respectively, (12) fuzzy logic evaluating each difference value determined in step (11), (13) directing the evaluation results obtained in step (12) to fuzzy logic rule sets for the specific heat consumption and each of said other process variables so as to obtain commands mandated by the rule sets, (14) applying the commands mandated by the fuzzy logic rule sets in step (13) to a fuzzy logic weighted averager, (15) applying the commands resulting from step (14) to kiln controls, (16) repeating steps (10)–(15) until end of the start-up period, and (17) switching over to pre-established computer-based steady-state fuzzy control mode.

* * * * *